UNITED STATES PATENT OFFICE.

RUDOLF HAUGWITZ, OF FRIEDRICHSHAGEN, NEAR BERLIN, GERMANY, ASSIGNOR TO ACTIEN GESELLSCHAFT FÜR ANILIN FABRIKATION, OF BERLIN, GERMANY.

AZO DYES.

1,405,687.   Specification of Letters Patent.   Patented Feb. 7, 1922.

No Drawing.   Application filed July 5, 1916. Serial No. 107,675.

*To all whom it may concern:*

Be it known that I, RUDOLF HAUGWITZ, a citizen of the Empire of Germany, residing at Friedrichshagen, near Berlin, Germany, my P. O. address being Seestrasse 97, Friedrichshagen, near Berlin, Germany, have invented certain new and useful Improvements in Azo Dyes, of which the following is a specification.

The objects of my invention are new azo-dyes derived from a diazo compound and an 8-hydroxy-derivative of quinoline, for instance of 8-hydroxyquinoline-sulfonic acid made by sulfonating 8-hydroxyquinoline. As diazo-compounds most adapted are those which are derived from aminoaryl-sulfonic acids of the benzene series. The manufacture is executed in the known manner by coupling the components in an alkaline menstruum. The dyes thus prepared are brownish powders which dye wool from aqueous solutions orange tints becoming fast to washing and milling when treated with chromic acid or chromates, yellow to brownish chromium lakes being formed. By strong reducing agents the dyes are destroyed.

In order to illustrate my invention without limiting it the following example is given, the parts being by weight:

19.5 parts of sodium aniline-3-sulfonate are diazotized in an aqueous solution by means of 50 parts of hydrochloric acid of 12° Bé. and 7 parts of sodium nitrite. The diazo-compound is then mixed with an aqueous solution of 22.5 parts of 8-hydroxyquinoline-sulfonic acid and 30 parts of calcined sodium carbonate. After combination the dye is salted out and dried. It dyes wool orange tints. After treatment with potassium bichromate a reddish yellow dyeing is obtained.

Having now described my invention what I claim is,—

1. The new dyes forming on wool yellow to brownish chromium lakes and being sulfonic acids of the azo-dyes which may be derived from a diazotized aromatic amine and 8-hydroxyquinolin and correspond to the formula:

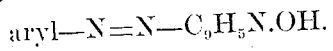
$$aryl—N=N—C_9H_5N.OH.$$

2. The new dyes forming on wool yellow to brownish chromium lakes which may be derived from a diazo-aryl-sulfonic acid and an 8-hydroxy-derivative of quinolin and correspond to the formula:

$$HO_3S—aryl—N=N—C_9H_4NX.OH$$

where X means hydrogen or a substituent.

3. The new dyes forming on wool yellow to brownish chromium lakes which may be derived from a diazo-aryl-sulfonic acid and 8-hydroxyquinolin-5-sulfonic acid and correspond probably to the formula:

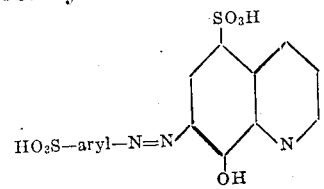

4. The new dye forming on wool a reddish yellow chromium lake which may be derived from diazo-benzene-3-sulfonic acid and 8-hydroxyquinolin-5-sulfonic acid and corresponds probably to the formula:

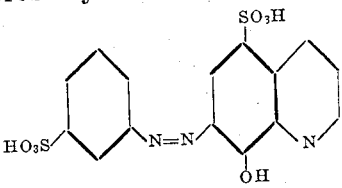

In testimony whereof I affix my signature in presence of two witnesses.

RUDOLF HAUGWITZ.

Witnesses:
HENRY HARSER,
ALLEN F. JENNINGS.